US006103377A

United States Patent [19]

[11] Patent Number: 6,103,377

[45] Date of Patent: Aug. 15, 2000

Clausi

[54] METHOD OF MOLDING POWDERED PLANT FIBER INTO HIGH DENSITY MATERIALS

[76] Inventor: Robert N. Clausi, c/o Matrix Composites Inc., 6310 Shawson Dr., Mississauga, Ontario, Canada, L5T 1H5

[21] Appl. No.: 09/198,626

[22] Filed: Nov. 24, 1998

Related U.S. Application Data

[62] Division of application No. 08/670,158, Jun. 27, 1996, Pat. No. 5,855,832.

[51] Int. Cl.$^7$ .......... B32B 5/06

[52] U.S. Cl. .......... 428/397; 428/221; 428/323; 428/292.4; 428/297; 428/332; 428/340; 428/357

[58] Field of Search .......... 428/221, 323, 428/332, 340, 357, 292.4, 397

[56] References Cited

U.S. PATENT DOCUMENTS

| | | |
|---|---|---|
| 2,471,628 | 3/1949 | Chaplin . |
| 2,527,628 | 8/1950 | Francis . |
| 3,166,617 | 1/1965 | Munk . |
| 3,238,281 | 3/1966 | Kato . |
| 3,261,897 | 7/1966 | Munk . |
| 3,341,009 | 9/1967 | Bennett . |
| 3,354,248 | 11/1967 | Haas . |
| 3,423,267 | 1/1969 | Munk . |
| 3,519,580 | 7/1970 | Schou . |
| 3,632,276 | 1/1972 | Munk . |
| 3,709,646 | 1/1973 | Munk . |
| 3,720,738 | 3/1973 | Munk . |
| 3,846,219 | 11/1974 | Kunz . |
| 4,010,096 | 3/1977 | Murray . |
| 4,078,030 | 3/1978 | Munk . |
| 4,175,105 | 11/1979 | Luck . |
| 4,247,511 | 1/1981 | Sutton . |
| 4,268,565 | 5/1981 | Luck . |
| 4,301,047 | 11/1981 | Jones . |
| 4,308,307 | 12/1981 | Heath . |
| 4,440,708 | 4/1984 | Haataja . |
| 4,466,853 | 8/1984 | Hartmann . |
| 4,505,869 | 3/1985 | Nishibori . |
| 4,559,194 | 12/1985 | Hegenstaller . |
| 4,568,581 | 2/1986 | Peoples . |
| 4,592,708 | 6/1986 | Feist . |
| 4,649,006 | 3/1987 | Heggenstaller . |
| 4,746,555 | 5/1988 | Luckanuck . |
| 4,781,956 | 11/1988 | Zimmermann . |
| 4,790,966 | 12/1988 | Sandberg . |
| 4,830,929 | 5/1989 | Ikeda . |
| 4,888,403 | 12/1989 | Ueda . |
| 4,941,948 | 7/1990 | Yamamoto . |
| 4,960,548 | 10/1990 | Ikeda . |
| 5,028,374 | 7/1991 | Imao . |
| 5,055,247 | 10/1991 | Ueda . |
| 5,134,026 | 7/1992 | Melcher . |
| 5,264,062 | 11/1993 | Ohsumi . |
| 5,338,592 | 8/1994 | Ohsumi . |
| 5,366,677 | 11/1994 | Mahanov . |
| 5,401,556 | 3/1995 | Ishitoya . |

FOREIGN PATENT DOCUMENTS

| | | |
|---|---|---|
| 2025658 | 12/1991 | Canada . |
| 2128919 | 2/1995 | Canada . |
| 0046014 | 2/1982 | European Pat. Off. . |
| 0161766 | 11/1985 | European Pat. Off. . |
| 0462586 | 12/1994 | European Pat. Off. . |
| 0664191 | 7/1995 | European Pat. Off. . |
| 0841055 | 3/1952 | Germany . |
| 58-208132 | 12/1983 | Japan . |
| 62142680 | 12/1988 | Japan . |
| 400439 | 10/1933 | United Kingdom . |
| 2265150 | 9/1993 | United Kingdom . |
| 9206382 | 4/1992 | WIPO . |
| 9400280 | 1/1994 | WIPO . |

OTHER PUBLICATIONS

Maloney, T.M., "The Family of Wood Composite Materials", Feb. 1996, pp. 19–26.

John J. Balatinecz and Tony E. Redpath "Progress in Wood-fibre–Plastic Composites", Apr. 25, 1994.

*Primary Examiner*—Richard Weisberger
*Attorney, Agent, or Firm*—Herbert M. Hanegan; J. Rodgers Lundsford, III; Eric J. Hanson

[57] ABSTRACT

A high density fiber product is made from natural lignin containing plant fibers. Plant fibers ranging in size below about 3000 microns in diameter are used. Binding agents and other additives may be mixed with the fibers to enhance product or process performance. The plant fibers or mixture of fibers and additives are heated to between about 50 degrees C. to about 140 degrees C. The heated fibers are compressed in a mold to an average density of about 50 pounds per cubic foot to about 100 pounds per cubic foot. Compression pressures of about 500 psi to about 2500 psi are used to achieve product densities within this range. The compressed fibers are cured under these temperature and pressure conditions. After the curing time has elapsed, the compressed fiber product is released from the mold and the mold may be reused. A high density product made from small plant fibers is provided.

38 Claims, No Drawings

METHOD OF MOLDING POWDERED PLANT FIBER INTO HIGH DENSITY MATERIALS

This application is a division of Ser. No. 08/670,158 filed Jun. 27, 1996 now U.S. Pat. No. 5,855,832.

The present invention relates to a method of molding powdered plant material containing protolignin into high density materials of various shapes, sizes and having other beneficial physical properties. Products which are manufactured in accordance with this method are also a part of this invention.

Many plant derived materials will be useful in practicing the method of the present invention, including, many untreated waste plant fibers containing protolignin. Potential sources of raw materials suitable for the present invention include wood fiber, straw, hemp, jute, pecan shells, walnut shells, agricultural wastes of various kinds, many post consumer wastes and many other protolignin containing plant fiber materials. Post consumer waste materials which are suitable for use with this method include medium density fiber board sandings.

Native lignin (or protolignin) occurs in plant fibers derived from Spermatophytes, Pteridophytes and mosses. Such plant fibers which have been converted into powdered form may be used according to the methods of the present invention to manufacture high density products having beneficial physical properties.

The potential raw material sources for the products and methods of the present invention are abundant and may be easily replenished through agricultural cultivation and other methods. However, there are existing supplies of suitable waste materials generated by lumber and forestry industries, agricultural operations and other industries which provide opportunities to practice the present invention with significant cost advantages over other potential sources of competitive materials. By way of further example, there are many waste materials such as leaves, bark and small twigs, and the like generated by tree harvesting operations which could be used to supply raw material for use with the present invention.

Although the following description will refer in many instances to wood flour or wood powders and wood related fibers, this invention is not limited to the use of raw materials derived from wood. For ease of reference, suitable raw materials in this specification will be referred to as powdered plant fibers which shall include suitable wood flour and powders derived from other usable portions of trees. Furthermore, multiple species of different plant fibers may be mixed for use in the manufacture of desired products.

The method of the present invention may be practiced to manufacture products useful in the construction industry, the manufacture of parts for motor vehicles, automotive products, materials for use in the aerospace industry, electronics and computer industries, hardware items and manufactured goods of various kinds and many other useful items. The method and products of this invention may also be utilized to provide alternatives to conventional plastics materials in the manufacture of injection molded and extruded products. The materials of the present invention may be used as replacements for structural plastics, thermoplastics and thermoset plastics. The present invention may be used to provide materials which exhibit superior strength characteristics in comparison to many conventional plastics and many wood containing materials. Indeed, the present invention may be used to provide molded plant fiber containing products which are superior in strength to natural wood.

It is also possible to use the present invention to provide materials which do not remelt at high temperatures and which exhibit relatively insignificant degrees of shrinkage. In addition, unlike the conventional systems of the prior art using relatively large plant or wood fibers, the present invention may be used to manufacture complicated three dimensional shapes having these superior qualities.

In further aspects of the invention, end products having exceptional machinability will also be provided. By way of comparison, many wood fiber formed materials of the prior art exhibit considerable degrees of tearing and fraying during cutting, drilling and other machining operations. However, the manufactured products of this invention exhibit superior machinability thereby reducing the finishing steps which might otherwise be necessary to meet the appearance requirements for the final products. Furthermore, the present invention may be used to provide exterior protective or decorative coatings as part of the simplified manufacturing process. The coatings may be provided as an integral feature of the finished products; the coatings need not be applied separately. Indeed, the coatings may be modified to achieve superior appearance and desirable physical properties achieved by the bonding between the applied coatings and underlying product structure.

In certain applications of the present invention, composite mixtures of fiber materials may be premixed with binding agents for storage or stockpiling prior to use in the manufacturing process. In many instances, premixed compositions of binding agents and plant fibers may be used several months after the premixtures have been formed. This is a particularly useful quality which may be exploited in the manufacture of certain products, including structural, decorative, or non structural product applications. By way of example, binding agents including diphenyl methane di-isocyanate, melamine, powdered ureas and other isocyanate containing binding agents may be premixed into intermediate composite mixtures which can be shipped for use at remote manufacturing facilities. The storage life of the intermediate product mixtures may be extended by selecting appropriate binding agents and using small particles of the binding agents appropriately mixed and held in suspension within the resulting intermediate mixture. In applications where isocyanate containing binders are used, it will be understood that the isocyanates may react with residual moisture contained within the intermediate plant fiber mixture. However, stabilizing additives may be used to inhibit the reaction between the isocyanates and residual moisture to prevent undesirable reactions or precuring during storage.

In many applications of this invention, it is possible to utilize the exceptionally strong bonds which will naturally arise between parts containing steel or aluminum and plant fiber mixtures containing diphenyl methane di-isocyanate. This bonding behavior may be particularly useful in manufacturing composite panels with layers of steel or aluminum containing members. For example, steel or aluminum clad exterior doors for use in the construction industry may be provided. Where a coating of diphenyl methane di-isocyanate is applied to a steel or aluminum member, and the plant fiber mixtures of the present invention are contacted with the coated surface, a very high degree of adhesion will occur between the metal and plant fiber layers. Many other applications using the products and methods of the present invention are also possible.

According to one method of the present invention, wood flour consisting of wood particles ranging in size may be used to manufacture the desired products. Wood particle sizes may range between about 50 microns to about 3000 microns in effective diameter. Plant fiber particles derived from other sources and which fall within this particle size range are acceptable. In the preferred method of this invention, the particle sizes will range between about 150 microns to about 1500 microns in effective diameter. It will be understood by those skilled in the art that many plant fiber particles will not be spherical in shape but rather will be somewhat elongated particles with an average length which is larger than the average width or thickness of those particles. Plant fiber particles may be sifted through corresponding mesh sizes to grade or separate fibers of different sizes. The effective diameter of a fiber particle will depend on its shape and whether it will orient itself to pass through a mesh or other size grading apparatus. It will also be understood that some fibers which fall outside of these limits may be present in the wood flour or other powdered plant material. If excessive quantities of significantly longer fibers are present, they may act as detrimental impurities which may compromise the quality and the appearance of the final product.

Particle size distributions may be varied within the specified ranges to offer improved product characteristics including surface finish and part strength. The length and aspect ratio of the particle sizes may be selected to optimize such product properties of the finished part.

The water content in a plant fiber material is an important consideration in practicing the method of the present invention. Excessive water content in the plant fiber materials may inhibit the manufacturing process and in some cases could present safety problems. For example, excessive moisture content in powdered plant fiber may lead to the formation of steam pockets within the product during the pressing step. If excessive steam is produced, product failure and other disadvantages may be presented when the product is removed from the mold. In addition, it may become necessary to compensate for the presence of excessive water content by introducing other additives. In many instances, it may be advantageous to use pre dried powdered plant fiber or, in the alternative, it may be useful to dry the powdered plant fiber before utilizing the plant fiber in the process. Water contents should be kept below about 20% (on a weight by weight basis) of powdered plant fiber. Water contents ranging between about 5% to about 12% (weight by weight) of powdered plant fiber are preferable in most cases.

According to one aspect of the present invention, a method for manufacturing high density plant fiber materials is provided. The method of the present invention comprises the steps of:

introducing powdered protolignin containing plant fiber particles with a diameter less than about 3000 microns into a mold;

heating the contents of the mold to a temperature between about 50 degrees C. to about 140 degrees C.;

compressing the contents of the mold to an average density of at least about 50 pounds per cubic foot;

curing the compressed contents within the mold; and releasing the cured contents from the mold.

Although a minimum temperature of about 50 degrees is indicated, it will be understood that heating the mold contents to higher temperatures during the curing step will result in significantly reduced curing times. By way of example, increasing the temperature of the contents to temperatures of about 60 to 70 degrees C. will very significantly reduce curing times in many instances.

The present invention also provides a method of manufacturing high density plant fiber materials in which the method comprises the steps of:

providing protolignin containing plant fibers containing less than 20 per cent water by weight, the fibers being between about 50 microns to about 3000 microns in diameter;

blending one or more of the group of additives comprising a binding agent, a pigment, a releasing agent, a catalyst, a flame retardant, a flame resistant agent, a fire resistant agent, and a lubricating agent with the plant fibers;

introducing the mixture of plant fibers and additives into the cavity of a mold;

compressing the mixture by applying a pressure of between about 500 psi to about 2500 psi to the surface of the mixture;

heating the contents of the mold cavity to between about 50 degrees C. to about 140 degrees C.;

curing the compressed contents;

removing the compressed contents from the mold; and cooling the compressed contents under controlled conditions.

In yet another embodiment, the present invention provides the products of the methods described above.

In yet another aspect, the present invention provides a high density plant fiber product made substantially from protolignin containing plant fibers of less than about 3000 microns in diameter compressed to an average density of at least about 50 pounds per cubic foot. It is preferred that the plant fibers be in the range of about 50 microns to 3000 microns in diameter, and it is yet further preferred that the fibers be in the range of about 150 microns to about 1500 microns in diameter. It is also further preferred that the product be compressed to an average density of between about 50 pounds per cubic foot to about 100 pounds per cubic foot.

In another aspect of the present invention, a plant fiber product mixture is provided comprising protolignin containing plant fibers of less than about 3000 microns in diameter and a binding agent equal to less than about 50 per cent of the amount of the plant fiber mixture.

In the prior art, a larger wood fiber size was generally equated with an expected increase in strength of lower density composite wood products. In general, a longer wood fiber was desirable because it would ultimately lead to stronger composite wood products such as particle board, medium density fiber boards, wafer boards and the like. Similar views were held in the field of manufacture of paper and cardboard products. In most instances, substantial wood particle sizes were desired to achieve improved product strength characteristics. In the prior art, larger wood particles were desirable to utilize the inherent high strength of the wood fibers themselves. Wood particle sizes were sought which were many times larger than the size ranges of plant fiber particles which are utilized according to the present invention. In the prior art systems using relatively high wood fiber sizes, proper wood fiber orientation was required to meet target strength characteristics. It was necessary to align the wood fibers in order to obtain the necessary efficiencies.

Many of the systems of the prior art utilized multiple step processes to form intermediate felts or preshaped intermediate products as a necessary element of the processes. Such systems were costly and time consuming. However, the present system does not require such costly investments in equipment and related facilities to manufacture the final product. The present invention does not require intermediate pressing, treatment or felt formation. Similarly, water consumption is reduced relative to many prior art systems. Environmental advantages and cost savings may be realized in this way. In addition, another advantage of the present invention provides reduced consumptions of binding agents to bind together the relatively small plant fiber materials used to form the final products. In most instances, the preferred binding agent concentration is only about 5% (weight by weight) of the plant fiber mixture. This concentration is substantially lower than the consumption levels of resins or other binding agents used in combination with much larger wood fibers, flakes or chips of the prior art.

However, according to the present invention, significantly smaller plant fiber particles are used to provide many desirable end product characteristics including improved product strength and appearance. Products are manufactured from relatively small plant fibers placed in omnidirectional orientation. High density products are manufactured by consuming relatively small quantities of binding agents or in some applications, by using no binding agent additives. The small plant fibers are bound together under substantial pressures to provide superior products and where for example, wood fibers are used, resulting products may be produced to have better strength characteristics than uncut pieces of the natural wood.

According to the preferred method of the present invention, suitably dried protolignin containing wood particles ranging in size between about 150 to about 1500 microns in diameter are selected for use in the process. In some instances, it may not be possible to prevent the introduction of modest quantities of substantially larger fibers because of equipment limitations or other factors. In general, low concentrations of substantially larger fiber sizes may be tolerated by the method of the present invention. Although, the presence of significant quantities of larger wood fibers or other materials may tend to inhibit the benefits relating to the use of smaller particle sizes within the noted size range. In many instances, the larger fibers will act as a filler when they are present in lower concentrations. Where significant quantities of the larger particles are present in the plant fiber material, the physical properties of the resulting product will tend to be limited by the lower strength of those larger plant fiber particles.

Where raw materials are available from several sources, it may be desirable to blend powdered plant fibers of different suitable plant species for use in the manufacturing process. However, it will be understood that variations in raw material quality and character will be governed by manufacturing standards, the desired product characteristics and related equipment specifications. In line continuous processes may be employed or batch wise manufacturing techniques may be utilized according to the present invention. Although the following description refers to a batch process, it will be understood that a continuous process may be employed with appropriate modifications.

With reference to the preferred method of the present invention, a resin is introduced to the wood flour particles (ranging in size between about 150 microns to about 1500 microns). The resin is blended with the flour to achieve substantially uniform distribution throughout the wood flour. The resin may be added by alternate methods, depending on a variety of factors including equipment availability and acceptable limits for operating costs. For example, higher manufacturing costs may be incurred due to consumption of larger quantities of resin and other additive materials, and longer batch preparation times.

According to a preferred method, a resin in liquid form may be injected into a batch of wood flour by spraying a fine mist of resin into contact with the wood flour. A suitable spray nozzle may be used for this purpose. Depending on the viscosity of the liquid resin, it may be useful to sufficiently heat the resin to reduce the viscosity of the fluid resin and enhance the formation of fine droplets when the resin passes through the sprayer nozzle. The resin spray may be added and distributed throughout the mixture over a period of time. The resin and flour mixture may be blended in a tank using a paddle type blender or other suitable blending equipment capable of adequately distributing the resin throughout the wood flour. The addition of resin material will be terminated after the desirable level of resin content is achieved. It will be understood that the level of resin may be optimized to achieve desired product characteristics and meet raw material cost specifications.

In the preferred embodiment, the preferred binding agent for this process is a resin, namely, a polymeric diphenyl methane di-isocyanate. The preferred level of this resin addition is about 5% (weight by weight) of wood flour mixture. In other instances, where resin additives are required, resin concentration levels may range from about 0.25% to about 20% (weight by weight) of wood flour mixture.

Examples of alternative resins include polyesters, urea formaldehyde, melamine-formaldehyde, and other binding agents. Where alternate resin materials are used, resin concentration levels may range between about 2% to about 50% (weight by weight) of wood flour mixture. Binding agents such as powdered, liquid or crystalline resins may be used. However, it will be understood that the addition of binding agents above about 20% by weight may not impart significant advantages in many instances. The relative costs of the binding agents are typically many times higher than the costs of the other raw materials used to manufacture products of this invention. Accordingly, lower concentrations of binding agents will be desired. It will also be understood that nonresinous binding agents may be substituted in other applications.

In most instances where a resin additive is utilized, a mold release agent will also be used. In the preferred method, where polymeric methane di-isocyanate is used, an internal mold release is added to enhance the removal of the finished product after the pressing cycle is completed. Examples of acceptable release agents for use in connection with this resin are potassium oleate, or silicone based and wax based release agents.

In other instances, where a binding agent additive is not to be used, adjustments will be made to the process steps to compensate for the absence of binding agent related additives. In most instances, longer pressing times will be required where plant fibers (without binding or resin additives) are pressed under corresponding temperatures and pressures. Although the addition of such resin materials to the powdered plant fiber will speed the manufacturing process, and provide for increased strength characteristics, the exact nature of the chemical reaction facilitated by the addition of resin is not fully understood. It is thought that the addition of resin to the protolignin containing plant fiber reacts with certain chemical groups in the lignin while the mixture is subjected to heat and pressure during the pressing step of the process. Where resin additives are not provided, it is believed that chemical groups in the protolignin react, whether by polymerization, or otherwise, to bind the lignin containing particles. However, no representation is made that this understanding is correct or that it is essential to successfully practicing the method of this invention. Furthermore, although such resins and release agents may be used, they are not essential. In many aspects of this invention, the absence of such resins and resin related materials may be compensated for by adjusting temperature, pressure and curing times as will be better understood from the further detailed description below.

Catalysts may be used to increase the rate of resin curing and thereby reduce the amount of pressing time required for a particular product. It is understood that there are many commercially available catalysts which may be selected to perform satisfactorily under specified manufacturing conditions.

With reference to the method of the present invention, blending of the resin and release agent will vary according to equipment specifications and process conditions. Typically, the blending step may be adjusted to require from several minutes to about one hour to complete in a batch operated process. The blending operation may also be used to mix in other additives such as catalysts, colorants, lubricants and other additives which are described further below. The blending step may be conducted in stages; for example, the resin may be blended with wood flour particles of a smaller size range, followed by the addition and blending of larger wood flour particles within the upper range of preferred particle sizes. As an alternative, a continuous in-line blending process may be provided using, for example, a screw blender. Other embodiments will also become apparent to those skilled in the art.

In the preferred embodiment, the blended resin, release agent and wood flour mixture is then introduced into the cavity of a mold for the desired composite product. The preferred method of introducing the blended composite material into the mold involves a gravity feed to draw a fluidized powder mixture into the mold. The initial volume of the mold cavity, the amount of blended composite mixture introduced into the mold cavity, and the final volume of the composite after mold compression, may be adjusted to produce the required density for the product. Alternative methods could utilize, for example, a low pressure auger, pressurized air flow or a vacuum to introduce the raw material mixture into the mold cavity. The vacuum could also be used to remove any excess water from the raw material mixture before the mixture enters the mold cavity.

In the preferred method, a compression mold is used. The size shape and other characteristics of the type of mold to be used may be specified according to the desired characteristics sought for the material products of this process. For example, the mold may provide the final shape of a product having a substantially smooth finished surface on at least one major face. In other applications, a webbed reinforcing structure may be provided on an opposite facing major surface of the product to conserve raw materials while providing added strength to the product. Although a compression mold is described with reference to the method of the preferred embodiment, other types of molds may also be employed. The preferred compression mold may also be filled volumetrically or based on a predetermined weight of raw material.

With reference to the method of the present invention, the mold is preheated to a temperature between about 50 degrees C. to about 140 degrees C. The mold may be provided with separate heat zones to impart acceptable product uniformity and strength, particularly with molds having intricately shaped internal cavities for shaping of the corresponding products. For example, separate heating zones may be advisable where there is a significant difference between the thickness of structural webs on the exterior surface of a part and the thickness of the main body of that pressed product part which supports the web. Such heating considerations will vary according to differences in product geometries. For example, if different mold inserts are used with a particular mold to manufacture differently shaped products, consideration should be given to whether it is necessary to vary the heating requirements for the different mold configurations and contents. It will be understood that increasing the heating temperature will generally reduce the curing time required to complete the manufacture of the end product.

In many instances it may be desirable to preheat the raw material mixture before it is introduced into the mold to reduce the time required to treat the materials within the mold. It will be understood that the reduced mold cycle times will improve the operating costs for many processes. For example, the raw materials may be preheated to a temperature within a range of about 40 degrees C. to 50 degrees C. for a relatively short period of time, after which the raw material mixture may be introduced into the mold for further heating and application of significant pressures. In some applications, the preheating temperature may range as high as about 60 degrees C., provided adequate precautions are taken to avoid precuring and the like. The preheating temperature and the timing of this step will be selected to ensure minimal precuring of the raw material mixture prior to introduction into the mold.

In many cases, the mold will not require a cooling step after completion of the pressing cycle. In certain instances, the pressing cycle will be essentially isothermal. However, that is not an essential requirement for the practice of this invention. Other, non isothermal processes may also be employed to manufacture products of this invention.

The molding temperature of the contained composite plant fiber and additives mixture is preferably established within the range of about 50 degrees C. to about 140 degrees C. for pressing. In the most preferred method of this invention, the mold and the contained wood flour composite mixture are heated to a molding temperature within a range of about 60 degrees C. to about 100 degrees C.

The upper range of the molding temperature for the plant fiber mixture will be about 140 degrees C., and in some circumstance may range as high as about 220 degrees C. The upper temperature range of the plant fiber mixture, including any additives, will vary according to the corresponding molding pressures specified for the process conditions used in accordance with the present invention. It will be understood that care should be taken to minimize the amount of plant fiber degradation which might otherwise occur at elevated temperature conditions, particularly above about 140 degrees C.

Where higher temperature conditions for the plant fiber mixtures are used, curing times will be significantly reduced to avoid significant fiber degradation or other undesirable conditions. Accordingly, it is preferred that the upper molding temperature of the plant fiber mixture be less than about 100 degrees C., although there will be conditions under which the present invention may be practiced at substantially higher temperatures, provided care is taken to control fiber degradation and the like.

The mold is activated to compress the contents of the mold to correspond to the final volume (and final density) of the final product. The mold and its contents are maintained at this setting until the curing time has elapsed. Again, the curing time will depend on a number of factors including the nature of the raw materials used, the nature of any additives, including resins, release agents, any catalysts, the thickness of the part being manufactured, the temperature to which the mixtures are heated during the pressing step and the molding pressure applied to the mold contents. The final densities of the products of this process exceed about 50 pounds per cubic foot. Preferably, the final product densities are between about 50 pounds per cubic foot to about 100 pounds per cubic foot. In other applications, average densities in excess of 100 pounds per cubic foot may also be provided. This may be compared with typical densities of soft woods in the range of about 25 to 26 pounds per cubic foot, white oak at about 47 pounds per cubic foot, hickory at about 51 pounds per cubic foot, and aluminum at about 130 pounds per cubic foot.

After the curing time has elapsed, the compressed composite product is removed from the mold, allowed to cool and stored for further manufacturing steps which may include drilling, machining, sanding or other finishing steps and the like. It is understood that processing time may be optimized to allow the fastest press cycle times while maintaining acceptable resin cure levels for a given part. Combinations of timers, process controllers, temperature controls and others features are expected to achieve satisfactory levels of automation for the manufacturing process.

The manufactured part may be removed from the mold and cooled under controlled conditions to minimize thermal stresses which might otherwise develop during molding. In most instances, the cooling will take place outside of the mold. This will reduce the cycle times and allow the mold to be used promptly in manufacturing another part.

In another embodiment of the invention, lubricating additives may be blended to the plant fiber and additives mixture to enhance the flow characteristics of plant fiber and additive particles during the manufacturing process. Larger sized plant fiber particles, including wood flour particles, may have a tendency to resist movement inside the mold during the pressing step. To enhance the flow characteristics of the particles, lubricating agents may be added to the raw material mixture including plant fibers, resin, release agents and other additives which may be specified in a particular process. The lubricating additives should be thoroughly mixed with the other components to facilitate effective lubrication of the materials prior to pressing. Lubricant additives may be used to enhance a more uniform product density resulting from pressing within particular mold conditions. Aminofunctional silica and amorphous silica additives are examples of some lubricating additives which are useful in many applications.

In a further embodiment of the present invention, other additives may also be included to enhance the performance of the manufactured composite product. Reinforcing materials may be added in sufficient quantities to enhance particular product strength characteristics. For example, metallic, glass, or other commercially available reinforcing members may be incorporated into the mold along with the raw materials, including the plant fiber particles and any other additives specified for the process. In most instances, an inert or non reactive structural member will be preferred. It is understood that unitary reinforcing members may be provided. In other instances, reinforcing members having multiple components may be desirable. In some instances, it may be desirable to incorporate reinforcing material having many individual reinforcing members, such as by way of example, reinforcing filaments or strands.

Various fasteners or other inserts may be incorporated into the product part by placing the fasteners or inserts into the mold cavity before pressing. The plant fiber and additives mixture may then be added to the cavity of the heated mold, pressed together with the fasteners or inserts into the desired product, followed by removal of the pressed product for cooling. Other materials, including textiles, paper, gelcoats, reinforcing mats, and surface transfers of surface coatings, also may be incorporated into the product during the molding process.

Where a reinforcing structure is added, it may become particularly important to consider adding a lubricating additive to enhance the flow of the plant fiber particles and other additives during the pressing stage. In other instances, it may be useful to include a binding agent to increase adhesion of the reinforcing structures to the plant fiber matrix. By way of example, a binder may be pre-coated on to the reinforcing structure before it is pressed with the plant fiber material and other additives. In other applications, a steel or aluminum reinforcing member may be used together with a polymeric diphenyl methane di-isocyanate resinous agent to bind the plant fiber particles and the reinforcing member. As a further modification, the metallic member may be preheated to a raised temperature prior to introduction of the reinforcement member and plant fiber mixture into the mold. The preheating of the member may be used to speed the curing of the contents of the mold.

In other embodiments of the present invention, coloring agents, cosmetic additives or pigments may be added to enhance the appearance of the finished product. For example, pigment may be added to a wood flour to achieve a product color which is suggestive of natural wood. The molding process may also be suitably modified to include a mold or other finishing tool capable of providing a surface texture suggestive of a natural wood grain finish. In other instances, it may be desirable to provide color and surface texture combinations which are suggestive of other natural or man made materials. As another example, a highly polished mold cavity may be used to press a smooth product surface requiring little or no sanding to finish the product. In general, a more highly polished mold cavity surface will result in a more glossy surface on the finished product. It is believed that under the process conditions of a preferred embodiment of the present invention, there is a tendency for urethane additives to migrate to the surface of the pressed product and to provide a glossy protective finish. A hard waterproof finish may be provided as an added advantage to products of the present invention. As an example, this method may be used to produce a high gloss finished floor material having enhanced water resistance. In addition, such a polyurethane finish tends to provide a self extinguishing fire resistance quality.

In some instances, it may be desirable to provide surface coatings made from other materials or from plant fibers which differ from the plant fibers used to form the substructure of the product. For example, if a lignin containing plant fiber of another type is considered for use as a surface coating, an electrostatic technique may be used to coat the surface of the mold cavity with those surface coating fibers, followed by a second step of filling of the mold cavity with a second type of plant fiber material and other additives. Other examples of available surface coatings may include conventional wood finishes, high temperature cured automotive enamel coatings, textiles, veneers, high pressure laminates and other materials which provide suitable surface coatings. Appropriate surface coatings may be selected according to the technique to be used to apply the surface coatings, the desired surface properties, cost and other considerations which will be understood by those skilled in the art.

In other embodiments of the present invention, additives may be provided to impart flame spread resistance, heat resistance, or flame retardant characteristics to the finished products. Suitable surface coatings which impart these properties may be provided by the above described method of this invention. In other instances, such additives may be distributed substantially throughout the product by mixing the flame or heat related additives with plant fiber material and other additives prior to pressing.

In certain applications, it may be desirable to use a variation of this invention which involves a two stage molding process. In the first stage of the molding process, a plant fiber mixture (including any desired additives) is preformed into a lower density part having a volume which is greater than the volume of the final product part. In the first stage, the pressing step will usually occur under lower temperature and pressure conditions. Sufficient quantities of unreacted lignin and additives will remain within the preformed part to permit further shaping and compression during the second stage. A second mold operating under different temperature and pressure conditions may be used for the final pressing cycle. The cycle times of the two stages may be different. The preformed part is subjected to the second pressing step to create the final part. This method may be used to vary the density and other characteristics of the plant fiber particles in different target regions within the final product. Accordingly, the density and strength of different parts of the product may be varied where that is desired. This process may also be used to press products which have complex shapes, including deep recesses and the like which may not be easily manufactured with a single pressing. Other examples include a process for pressing high density fiber material about a metallic reinforcing member. For example, a steel beam may be introduced into a mold having a clam shell design, the fiber and binding agent mixture may be added to the mold, and then pressing the fiber mixture around the structural member. The added layer of high density fiber material may be provided to add to the strength of the reinforcing member. Other advantages also may be imparted with this two stage method.

Further useful modifications to the methods and products disclosed herein may be made without departing from the scope of this invention. Such useful modifications will be apparent to those skilled in the art and are intended to fall within the scope of the following claims.

What is claimed is:

1. A high density plant fiber product made substantially from plant fibers containing protolicnin and being of less than about 3000 microns in diameter compressed to an average density of at least about 50 pounds per cubic foot.

2. The product of claim 1 wherein the said product has been compressed to an average density of at least 60 pounds per cubic foot.

3. The product of claim 1 wherein the plant fibers are between about 50 microns to about 1500 microns in diameter.

4. The product of claim 1 wherein the plant fibers are compressed to an average density of between about 50 pounds per cubic foot to about 100 pounds per cubic foot.

5. The product of claim 4 wherein the plant fibers comprise less than about 20 per cent water by weight.

6. The product of claim 5 wherein the plant fibers comprise between about 5 per cent and 12 per cent water by weight.

7. The product of claim 6 containing one or more of the group of additives comprising a binding agent, a releasing agent, a surface coating, a catalyst, a flame retardant, a flame resistant agent, a fire resistant agent, and a lubricating agent.

8. The product of claim 7 containing a binding agent and release agent, the binding agent comprising between about 0.25 per cent and about 50 per cent by weight of the plant fiber mixture.

9. The product of claim 8 containing a binding agent comprising between about 2 per cent and about 20 per cent by weight of the plant fiber mixture.

10. The product of claim 6 wherein the plant fibers are compressed to an average density of between about 60 pounds per cubic foot to about 90 pounds per cubic foot.

11. The product of claim 9 wherein the plant fibers are compressed to an average density of between about 60 pounds per cubic foot to about 90 pounds per cubic foot.

12. The product of claim 9 wherein the binding agent is a resin.

13. The product of claim 12 wherein the resin is one of the group of unsaturated polyester resin, polymeric diphenyl methane di-isocyanate.

14. A plant fiber product mixture comprising plant fibers containnig protolignin and being of less than about 3000 microns in diameter and a binding agent equal to less than about 50 per cent by weight of the plant fiber mixture.

15. The product of claim 14 wherein the amount of binding agent represents less than about 20 per cent of the amount of plant fiber mixture.

16. The product of claim 14 wherein the binding agent is a resin.

17. The product of claim 16 wherein the resin is one of the group of unsaturated polyester resin, polymeric diphenyl methane di-isocyanate, methane di-isocyanate, melamine, urea, ester containing compounds, urea formaldehyde, and melamine-formaldehyde.

18. The product of claim 17 wherein the plant fibers are between about 50 microns to about 1500 microns in diameter.

19. The product of claim 18 wherein the plant fibers contain less than about 20 per cent water.

20. The product of claim 19 wherein the amount of binding agent is less than about 5 per cent of the plant fiber mixture.

21. A high density plant fiber product manufactured by a method comprising the steps of:

introducing powdered plant fiber particles containing protolignin and with a diameter less than 3000 microns into a mold;

heating the contents of the mold to a temperature between 50 degrees C. to 220 degrees C.;

compressing the powdered contents of the mold to an average density of at least 50 pounds per cubic foot;

curing the compressed contents within the mold; and releasing the compressed contents from the mold.

22. A high density plant fiber product manufactured by a method comprising the steps of:

providing plant fibers containing protolignin and containing less than 20 per cent water by weight, the fibers being between 50 microns to 3000 microns in diameter;

blending a fluidized mixture of plant fibers and one or more of the group of additives consisting of a thermoset binding agent, a pigment, a releasing agent, a catalyst, a flame retardant, a flame resistant agent, a fire resistant agent, and a lubricating agent;

introducing the fluidized mixture of plant fibers and additives into the cavity of a mold;

compressing the mixture by applying a pressure of at least 500 psi to the surface of the mixture;

heating the contents of the mold cavity to between 50 degrees C. to 220 degrees C.;

curing the compressed contents; and removing the compressed contents from the mold.

23. A high density plant fiber product manufactured by a method comprising the steps of:

preparing a particulate mixture comprising plant fibers less than 1500 microns in diameter and containing protolignin, a thermoset binding agent, and one or more of the group of additives consisting of a pigment, a releasing agent, a catalyst, a flame retardant, a flame resistant agent, and a lubricating agent;

introducing the particulate mixture into a mold;

heating the particulate mixture to a temperature between 60 degrees C. and 220 degrees C.;

compressing the mixture to an average density of at least 60 pounds per cubic foot within the mold; and removing the compressed contents from the mold.

24. The product of claim 1 compressed to an average density of at least 60 pounds per cubic foot.

25. The product of claim 24 made from the said plant fibers in a mixture comprising a thermoset binding agent and one or more of the group of additives comprising a releasing agent, a surface coating, a catalyst, a flame retardant, a flame resistant agent, pigment, and a lubricating agent.

26. The product of claim 25 wherein the binding agent is one of the group of unsaturated polyester resin, polymeric diphenyl methane di-isocyanate, methane di-isocyanate, melamine, urea, ester containing compounds, urea formaldehyde, and melamine-formaldehyde.

27. The product of claim 26 wherein the amount of the binding agent in the mixture is less than 25 per cent by weight of the mixture.

28. The product of claim 27 compressed to an average density of at least 70 pounds per cubic foot.

29. The product of claim 28 wherein the amount of binding agent in the mixture is less than 10 per cent by weight of the mixture.

30. The product of claim 27 comprising at least two zones, the first zone being compressed to a first density, the second zone being compressed to a second density, and the first density being greater than the second density.

31. The product of claim 30 wherein the density of the first zone is at least 60 pounds per cubic foot.

32. The product of claim 30 compressed to an average density of at least 75 pounds per cubic foot.

33. The product of claim 28 comprising an internal reinforcing member.

34. The product of claim 26 wherein the plant fibers are less than 1500 microns in diameter.

35. The product of claim 1 made from the said plant fibers in a mixture comprising a thermoset binding agent and one or more of the group of additives comprising a releasing agent, a surface coating, a catalyst, a flame retardant, a flame resistant agent, pigment, and a lubricating agent; the binding agent being one of the group of unsaturated polyester resin, polymeric diphenyl methane di-isocyanate, methane di-isocyanate, melamine, urea, ester containing compounds, urea formaldehyde, and melamine-formaldehyde, in an amount of less than 25% by weight of the mixture; and the mixture having been compressed into at least two zones, the first zone being compressed to a first density, the second zone being compressed into a second density, and the first density being greater than the second density.

36. The product of claim 35 wherein the plant fibers are less than 1500 microns in diameter.

37. The product of claim 36 wherein the amount of binding agent in the mixture is less than 10 per cent by weight of the mixture.

38. The product of claim 37 wherein the second density is at least 60 pounds per cubic foot and the first density is at least 75 pounds per cubic foot.

* * * * *